(12) United States Patent
Bryan

(10) Patent No.: US 12,026,794 B2
(45) Date of Patent: Jul. 2, 2024

(54) SYSTEM AND METHOD FOR CONNECTING CLIENTS WITH ATTORNEYS

(71) Applicant: Paulina Bryan, Orange, NJ (US)

(72) Inventor: Paulina Bryan, Orange, NJ (US)

( * ) Notice: Subject to any disclaimer, the term of this patent is extended or adjusted under 35 U.S.C. 154(b) by 508 days.

(21) Appl. No.: 16/284,478

(22) Filed: Feb. 25, 2019

(65) Prior Publication Data

US 2019/0266685 A1 Aug. 29, 2019

Related U.S. Application Data

(60) Provisional application No. 62/634,558, filed on Feb. 23, 2018.

(51) Int. Cl.
*G06Q 50/18* (2012.01)
*H04M 1/2745* (2020.01)
(Continued)

(52) U.S. Cl.
CPC .......... *G06Q 50/18* (2013.01); *H04M 1/2745* (2013.01); *H04M 1/27475* (2020.01);
(Continued)

(58) Field of Classification Search
CPC ...... G06Q 50/18; G06Q 10/10; G06Q 10/103; G06Q 10/00; G06Q 30/018; G06Q 10/06; G06Q 10/101; G06Q 10/1095; G06Q 20/12; G06Q 20/145; G06Q 20/28; G06Q 30/0601; G06Q 30/0613; G06Q 40/12; G06Q 50/184; G06Q 10/02; G06Q 20/023; G06Q 20/102; G06Q 20/18; G06Q 20/308; G06Q 20/321; G06Q 20/3223; G06Q 20/3276; G06Q 20/382; G06Q 20/389; G06Q 30/016; G06Q 30/02;
(Continued)

(56) References Cited

U.S. PATENT DOCUMENTS 8,160,235 B2 * 4/2012 Brown .................. H04M 3/523
379/266.01
9,497,173 B2 * 11/2016 Snow .................. G06F 21/6245
(Continued)

FOREIGN PATENT DOCUMENTS

WO 2016/145425 A1 9/2016

*Primary Examiner* — Akelaw Teshale
(74) *Attorney, Agent, or Firm* — Gearhart Law, LLC

(57) ABSTRACT

Systems and methods for remote communication with a legal professional is provided. The method includes sending, using a graphical user interface coupled to an electronic device of a user, a request for communication with the legal professional, wherein the request includes identifiable information about a user, and wherein the electronic device of the user includes a processor and a memory. The method further includes notifying the legal professional of the request and accepting the request, using a graphical user interface coupled to an electronic device of the legal professional, wherein the electronic device of the legal professional includes a processor and a memory. The method additionally includes sending identifiable information about the legal professional to the user and enabling communication between the user and the legal professional using sensors coupled to the electronic device of the user and sensors coupled to the electronic device of the legal professional.

16 Claims, 3 Drawing Sheets

(51) Int. Cl.
*H04M 1/27475* (2020.01)
*H04M 1/57* (2006.01)
*H04M 3/53* (2006.01)
*H04M 3/537* (2006.01)

(52) U.S. Cl.
CPC ......... *H04M 1/575* (2013.01); *H04M 3/5307* (2013.01); *H04M 3/537* (2013.01)

(58) Field of Classification Search
CPC ........... G06Q 30/0273; G06Q 30/0281; G06Q 30/0283; G06Q 30/06; G06Q 30/0641; G06Q 30/08; G06Q 40/08; G06Q 50/06; G06Q 50/14; G06Q 50/186; H04M 1/2745; H04M 1/27475; H04M 1/575; H04M 3/5307; H04M 3/537; H04M 3/5125; H04M 3/5231; H04M 1/271; H04M 1/27455; H04M 3/00; H04M 7/003; H04L 63/08
See application file for complete search history.

(56) References Cited

U.S. PATENT DOCUMENTS

| | | |
|---|---|---|
| 9,578,152 B2 | 2/2017 | Schoenberg |
| 9,680,838 B1 * | 6/2017 | Hodge ................ H04L 65/1073 |
| 9,990,608 B2 * | 6/2018 | Phillips ................ G06Q 10/103 |
| 2003/0112949 A1 * | 6/2003 | Brown ................ H04M 3/2281 379/207.14 |
| 2004/0103040 A1 | 5/2004 | Ronaghi et al. |
| 2005/0002497 A1 * | 1/2005 | Brown .................... H04M 1/54 379/88.19 |
| 2008/0147741 A1 * | 6/2008 | Gonen .................. G06Q 10/10 |
| 2009/0113312 A1 * | 4/2009 | Schoenberg .......... H04L 67/306 709/204 |
| 2009/0210558 A1 * | 8/2009 | Bocook .................. G06Q 10/10 707/E17.014 |
| 2011/0119197 A1 * | 5/2011 | Turchin ................. G06Q 10/10 715/781 |
| 2011/0320370 A1 * | 12/2011 | Henry, Jr. ............. B60R 25/305 348/E7.078 |
| 2014/0250020 A1 * | 9/2014 | Mooney ................. G06Q 10/10 705/317 |
| 2014/0337093 A1 * | 11/2014 | Jain ....................... H04L 67/131 705/7.29 |
| 2014/0343991 A1 * | 11/2014 | Hofstee .............. G06Q 30/0601 705/7.18 |
| 2017/0083993 A1 | 3/2017 | Kurzman et al. |
| 2017/0307406 A1 * | 10/2017 | Quady ....................... H02J 3/12 |
| 2017/0323305 A1 * | 11/2017 | Pradeep ............. G06Q 20/4014 |
| 2018/0122025 A1 * | 5/2018 | Boesen ................. G06Q 50/18 |
| 2018/0350180 A1 * | 12/2018 | Onischuk ............... G07C 13/00 |
| 2019/0166255 A1 * | 5/2019 | Reddy ............... H04M 3/42153 |

\* cited by examiner

SYSTEM AND METHOD FOR CONNECTING CLIENTS WITH ATTORNEYS

CLAIM OF PRIORITY

This application is a United States non-provisional patent application and claims priority to U.S. Provisional Patent Application No. 62/634,558, filed Feb. 23, 2018, herein incorporated by reference in its entirety.

FIELD OF THE EMBODIMENTS

The embodiments of this invention relate to communications systems and methods and, in particular, to systems and methods for remotely communicating with legal professionals.

BACKGROUND OF THE EMBODIMENTS

There are many instances in which it is beneficial to have the counsel of a legal professional. Many times, it is advised that, before any further action be taken, a legal professional is contacted. However, in many instances, during these times of need and necessity, it is difficult and, oftentimes, expensive to contact a legal professional on a moment's notice. This leads to many decisions being made without the aid of legal counsel and many instances in which individuals act without knowing or fully understanding their rights in any given instance.

For at least these reasons, a system and method for quickly, easily, and efficiently contacting legal professionals in times of need is needed.

Examples of related art are described below:

U.S. Pat. No. 9,578,152 generally describes techniques for providing broker services to consumers and service providers based on telephonic call-back engagements. The techniques include receiving a telephonic-based communication from a consumer to consult with a service provider and determining a suitable service provider to reply to the telephonic-based communication from the consumer. The techniques add an entry corresponding to the consumer to a queue maintained for the suitable service provider, and when the consumer in the queue is at the top of the queue, initiate a call-back to a device used by the consumer.

U.S. Patent Publication No. 2004/0103040 generally describes a system, method and computer program product for an online web-based law community for information sharing, collaboration and vending of services between attorneys and clients. Applications servers (ASs) and database servers (DSs) are provided for the features and functions of permitting clients to investigate attorneys by set factors (including region, jurisdiction, legal practice area, community and external reputation) and permitting attorneys to investigate clients by set factors (including region, industry, payment practices, community and external reputation). The AS/DSs also facilitate client provisioning of legal tasks, engagement of attorneys by clients, online communications between parties (through real-time chats, video, message threads), providing of standard or alternative billing, banking of payments between parties, and management of the progression of work performance and deliverables.

U.S. Patent Publication No. 2009/0113312 generally describes a real-time communication between a consumer of services and a provider of legal services that is brokered using a brokerage system on a computer by: receiving a request from the consumer of services to consult with a provider of legal services; identifying an available provider of legal services; and activating a communication channel between the consumer of services and the available provider of legal services. Providers of legal services include, but are not limited to, an attorney, paralegal, or a legal advisor.

U.S. Patent Publication No. 2009/0210558 generally describes systems, methods and computer program products for establishing and operating a virtual professional service organization. In an aspect, a virtual, global law firm is provided to consumers having access to a personal computer or other terminal in communications with the Internet, such that attorneys are capable of responding to their legal needs via video conferencing, VoIP telephone, chat, electronic mail and other forms of remote communications over the Internet. The result is the provisioning of quick, cost-effective and quality legal services to under-served populations.

U.S. Patent Publication No. 2011/0320370 generally describes systems and methods for providing on call real-time remote legal services by utilizing wireless audio and video components that also allow for two-way communication. The embodiments enable an individual to have access to legal representation and consult with legal counsel at the time an incident occurs.

U.S. Patent Publication No. 2014/0343991 generally describes a system and related method for providing advice as a service offered via a server over a network. Advisor profiles are published with instructions for contacting the advisors, along with working hours or similar information. Advisees, who have profiles of their own, can request advice and be connected to an advisor for a communication session using text, video chat, email, or VoIP. Affiliates can gain commissions for referred advisees, and third-party websites can also host the services the system offers on the back end. Advisors can also give webinars, and attending advisees can ask questions by text.

U.S. Patent Publication No. 2017/0083993 generally describes systems, methods, and media for providing virtual mock trials. A system includes one or more hardware processors that are operative to initiate an interactive mock trial session via a network to a plurality of remote participants. The one or more hardware processors generate first and second presentation displays of the mock trial, each having an arrangement of content that may include a live-action video, a pre-recorded video, an image, interactive actuators or icons, text, or combinations thereof. The first display has a first set of interactive options and is transmitted to a plurality of mock jurors, while the second display has a second set of interactive options and is transmitted to at least one other remote participant, which may be, for example, a trial manager, an attorney, or an observer. Evaluations of the mock trial are interactively completed and received by the hardware processor.

International Patent Publication No. WO 2016145425A1 generally describes methods, systems, devices and software products (computer program products) for creating and maintaining a transactional platform and network for offering, providing, selling and purchasing services, content and time.

None of the art described above addresses all of the issues that the present invention does.

SUMMARY OF THE EMBODIMENTS

According to an aspect of the present invention, a method for remote communication with a legal professional is provided. The method includes sending, using a graphical user interface coupled to an electronic device of a user, a request for communication with the legal professional, wherein the request includes identifiable information about a user, and wherein the electronic device of the user includes a processor and a memory. The method further includes notifying the legal professional of the request and accepting the request, using a graphical user interface coupled to an electronic device of the legal professional, wherein the electronic device of the legal professional includes a processor and a memory. The method additionally includes sending identifiable information about the legal professional to the user acid enabling communication between the user and the legal professional using sensors coupled to the electronic device of the user and sensors coupled to the electronic device of the legal professional.

It is an object of the present invention to provide the method of remote communication with a legal professional, wherein the method further includes sending the request to one or more contacts selected by the user.

It is an object of the present invention to provide the method of remote communication with a legal professional, wherein the method further includes enabling the one or more contacts to see a communication between the user and the legal professional.

It is an object of the present invention to provide the method of remote communication with a legal professional, wherein the d further includes enabling the one or more contacts to contribute to a communication between the user and the legal professional.

It is an object of the present invention to provide the method of remote communication with a legal professional, wherein the sensors coupled to the electronic device of the user and the sensors coupled to the electronic device of the legal professional are selected from the group consisting of: a microphone; a camera; and the graphical user interface.

It is an object of the present invention to provide the method of remote communication with a legal professional, wherein the electronic device of the user and the electronic device of the legal professional are coupled via a remote server.

It is an object of the present invention to provide the method of remote communication with a legal professional, wherein the identifiable information about the user is selected from the group consisting of: a name; an address; a phone number; a location; and a problem at hand for the user.

It is an object of the present invention to provide the method of remote communication with a legal professional, wherein the method further includes recording data pertaining to the communication between the user and the legal professional.

It is an object of the present invention to provide the method of remote communication with a legal professional, wherein the method further includes storing the data on a remote server.

According to another aspect of the present invention, a system for remote communication with a legal professional is provided. The system includes an electronic device of a user, wherein the electronic device of the user includes a memory, a processor, a graphical user interface, and one or more sensors, and wherein the electronic device of the user is configured to record, using the graphical user interface, a request for communication with the legal professional, wherein the request includes identifiable information about the user, notify the legal professional of the request, send the request, and communicate with an electronic device of the legal professional using the one or more sensors. The system further includes the electronic device of the legal professional, wherein the electronic device of the legal professional includes a memory, a processor, a graphical user interface, and one or more sensors, and wherein the electronic device of the legal professional is configured to receive, using the graphical user interface, the request for communication with the legal professional, accept the request, and communicate with the electronic device of the user using the one or more sensors.

It is an object of the present invention to provide the system of remote communication with a legal professional, wherein the electronic device of the user is further configured to send the request to one or more contacts selected by the user.

It is an object of the present invention to provide the system of remote communication with a legal professional, wherein the system further includes an electronic device of the one or more contacts selected by the user, and wherein the one or more contacts selected by the user are enabled, through the electronic device of the one or more contacts selected by the user, to see a communication between the user and the legal professional.

It is an object of the present invention to provide the system of remote communication with a legal professional, wherein the system further includes an electronic device of the one or more contacts selected by the user, and wherein the one or more contacts selected by the user are enabled, through the electronic device of the one or more contacts selected by the user, to contribute to a communication between the user and the legal professional.

It is an object of the present invention to provide the system of remote communication with a legal professional, wherein the system further includes a remote server configured to couple the electronic device of the user and the electronic device of the legal professional.

It is an object of the present invention to provide the system of remote communication with a legal professional, wherein the remote server is further configured to record data pertaining to communication between the user and the legal professional.

It is an object of the present invention to provide the system of remote communication with a legal professional, wherein the remote server is further configured to store the data.

It is an object of the present invention to provide the system of remote communication with a legal professional, wherein the sensors coupled to the electronic device of the user and the sensors coupled to the electronic device of the legal professional are selected from the group consisting of: a microphone; a camera; and the graphical user interface.

It is an object of the present invention to provide the system of remote communication with a legal professional, wherein the identifiable information about the user is selected from the group consisting of: a name; an address; a phone number; a location; and a problem at hand for the user.

DESCRIPTION OF THE PREFERRED EMBODIMENTS

Figure 1:
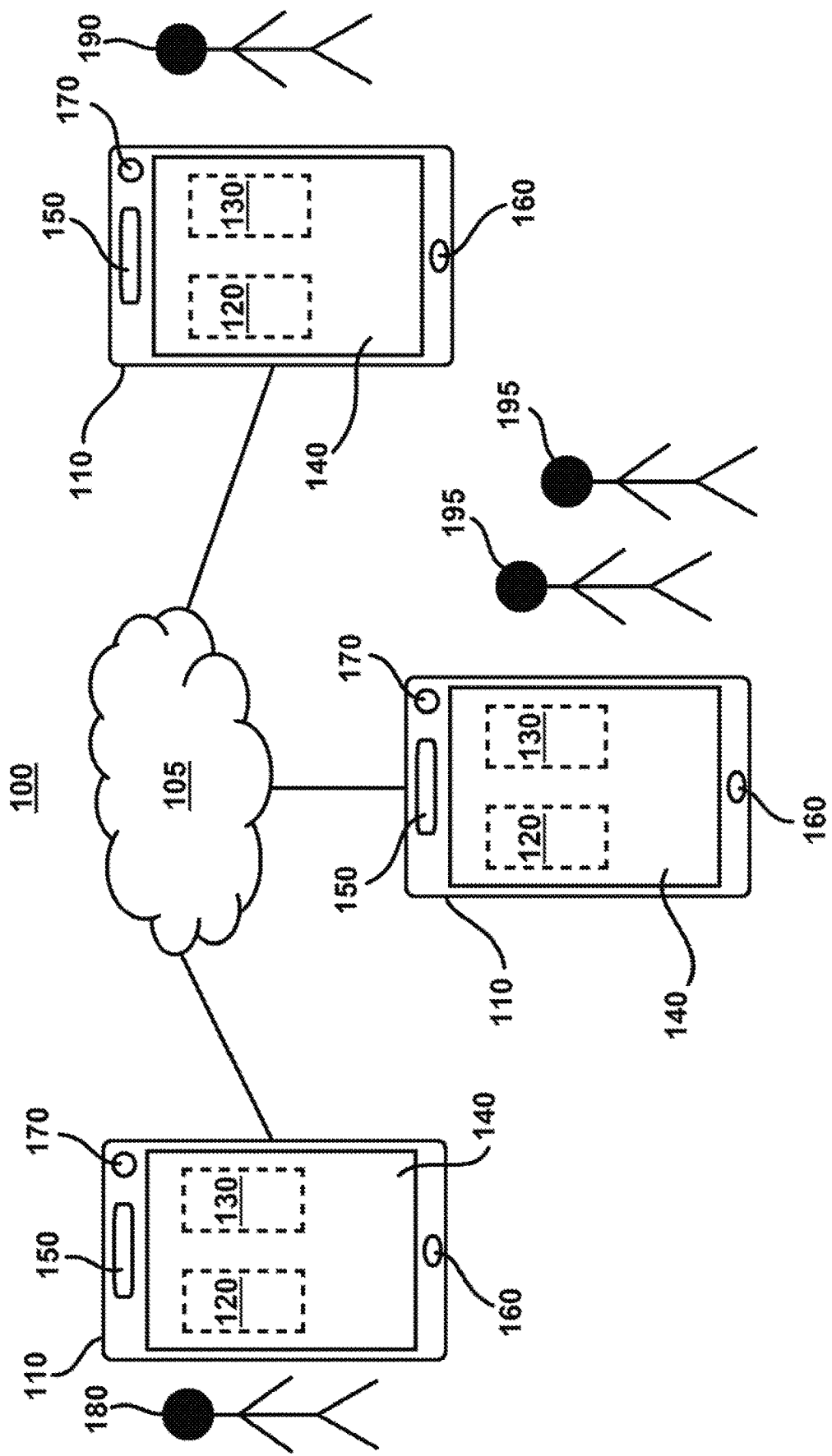
FIG. 1 shows a system for communicating with a legal professional, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, a system 100 for communicating with a legal professional is illustratively depicted, in accordance with an embodiment of the present invention.

According to an embodiment, the system 100 may include one or more electronic devices 110. The one or more electronic devices 110 may include a desktop computer, a laptop computer, a tablet computer, a smartphone, and/or any other suitable electronic device. According to an embodiment, the one or more electronic devices 110 includes a processor 120, a memory 130, and/or one or more graphical user interfaces 140. According to an embodiment, the one or more electronic devices may further include a speaker 150, a microphone 160, and/or a camera 170, configured to enable communication between one or more users 180, 190.

According to an embodiment, the one or more electronic devices 110 may include a means for determining a location of a user 180, 190 such as, e.g., GPS tracking, wireless Internet tracking, and/or any other suitable geolocation tracking means. According to an embodiment, the means for determining the location is controlled by the processor 120.

According to an embodiment, the graphical user interface 140 is configured to enable a first user 180 to request communication with a second user 190. According to an embodiment, the second user 190 is a professional such as, e.g., a licensed attorney. According to an embodiment, if the first user 180 is a minor, the system 100 is further configured to initiate communication between the first user 180, the second user 190, and an additional third party. According to an embodiment, the additional third party is a parent and/or guardian of the first user 180. According to an embodiment, the third party is contacted in order to provide consent to the communication between the first user 180 and the second user 190.

According to an embodiment, the first user 180 and the second user 190 are able to communicate via the graphical user interface 140, the speaker 150, the microphone 160, and/or the camera 170.

According to an embodiment, the electronic device 110 includes a digital application stored in the memory 130. The digital application may be a computer program, a website, and/or any other suitable digital application. According to an embodiment, the digital application is configured to enable communication between the first user 180 and the second user 190. According to an embodiment, the digital application incorporates relevant laws pertaining to the communication between the first user 180 and the second user 190 and/or relevant laws pertaining to the issue at hand that the first user 180 is facing. According to an embodiment, the system 100 automatically updates the laws saved to the system as updated laws become available.

According to an embodiment, the user 180, using the graphical user interface 140, selects one or more individuals 195 (e.g., friends, family members, etc.) to receive a notification upon completion of a request to communicate with a legal professional 190. According to an embodiment, upon completing a request to communicate with a legal professional 190, the system 100 sends the notification to the one or more individuals 195 selected by the user 180. According to an embodiment, the notification is sent to one or more electronic devices 110 of the one or more users 195 selected by the user 180. According to an embodiment, the notification may include text, sounds, images, and/or any other means of notification. According to an embodiment, the notification may be an email, SMS, and/or any other suitable form of communication. According to an embodiment, any notifications received by the user 180, the legal professional 190, and/or any of the one or more individuals may include, e.g., sounds, vibrations, visual aspects, and/or any other suitable means of notification.

According to an embodiment, the notification may include the location of the user 180, any issues that the user 180 wishes to resolve, the name and/or contact information for the legal professional 190 in contact with the user 180, and/or any other relevant information pertaining to the user's 180 completed request.

According to an embodiment, the request to speak with a legal professional 190 may include a message from the user 180 indicating the issue to be resolved. It is also noted that the request may also be a generic request to speak with a legal professional 190 that includes no information regarding the specific issue presently at hand for the user 180. According to an embodiment, the request to speak with a legal professional 190 is voice activated. According to an embodiment, the request is manually input into the electronic device 110, using the graphical user interface 140.

According to an embodiment, the user 180 may communicate with the legal professional 190 through typed message, through voice communication, through video communication, and/or any other relevant form of communication. According to an embodiment, once the legal professional 190 commences communication with the user 180, a video feed with the legal professional 190 commences, whereby the user 180 can see and/or hear the legal professional 190 on the electronic device 110 and the legal professional 190 can see and/or hear the user 180. According to an embodiment, the one or more individuals 195 the user 180 selected to receive a notification upon completion of the request to communicate with the legal professional 190 are granted access to the communication between the user 180 and the legal professional 190. According to an embodiment, the one or more individuals 195 the user 180 selected to receive a notification upon completion of the request to communicate with the legal professional 190 are granted access to join in the communication between the user 180 and the legal professional 190.

According to an embodiment, upon requesting communication with a legal professional 190, the digital application, using one or more sensors (e.g., microphones 160, cameras 170, etc.) coupled to the electronic device 110, records data picked up by one or more of the sensors (e.g., sound recorded using the microphone 160, images recorded using the camera 170, etc.). According to an embodiment, this recorded data is saved to a remote server 105 using a wired and/or wireless connection the data is saved to the cloud). According to an embodiment, the one or more electronic devices 110 are coupled via the server 105.

According to an embodiment, upon commencement of communication between the user 180 and the legal professional 190, the application sends information pertaining to the user 180 (e.g., name, location, phone number, e-mail address, etc.) to the legal professional 190, and sends the information pertaining to the legal professional 190 (e.g., name, location, phone number, e-mail address, etc.) to the user 180. According to an embodiment, the application sends the one or more individuals 195 the user 180 selected to receive a notification upon completion of the request to communicate with the legal professional the information pertaining to the user and/or the information pertaining to the legal professional.

Figure 2:
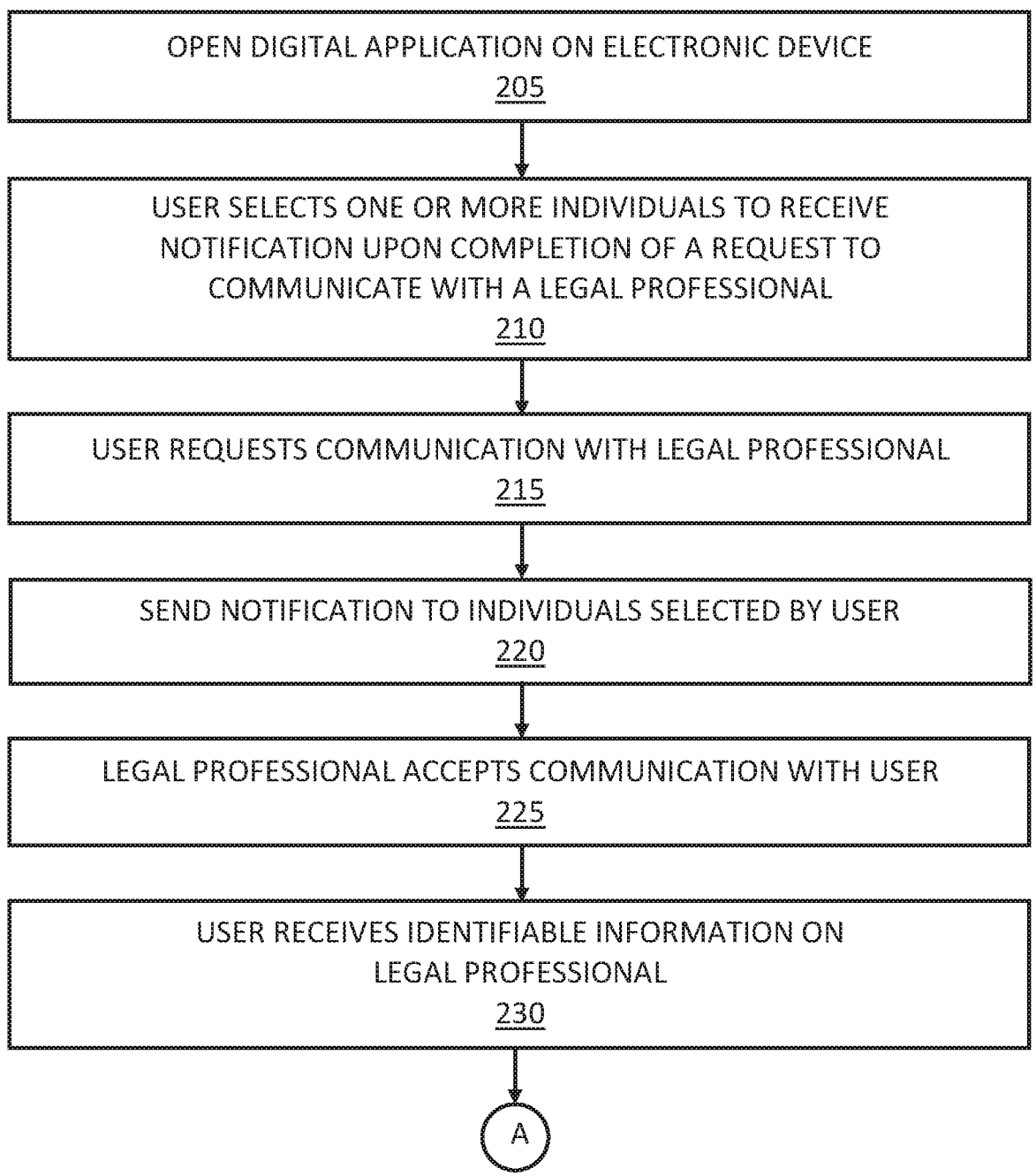
FIGS. 2-3 show a method for communicating with a legal professional, according to an embodiment of the present invention.
Figure 3:
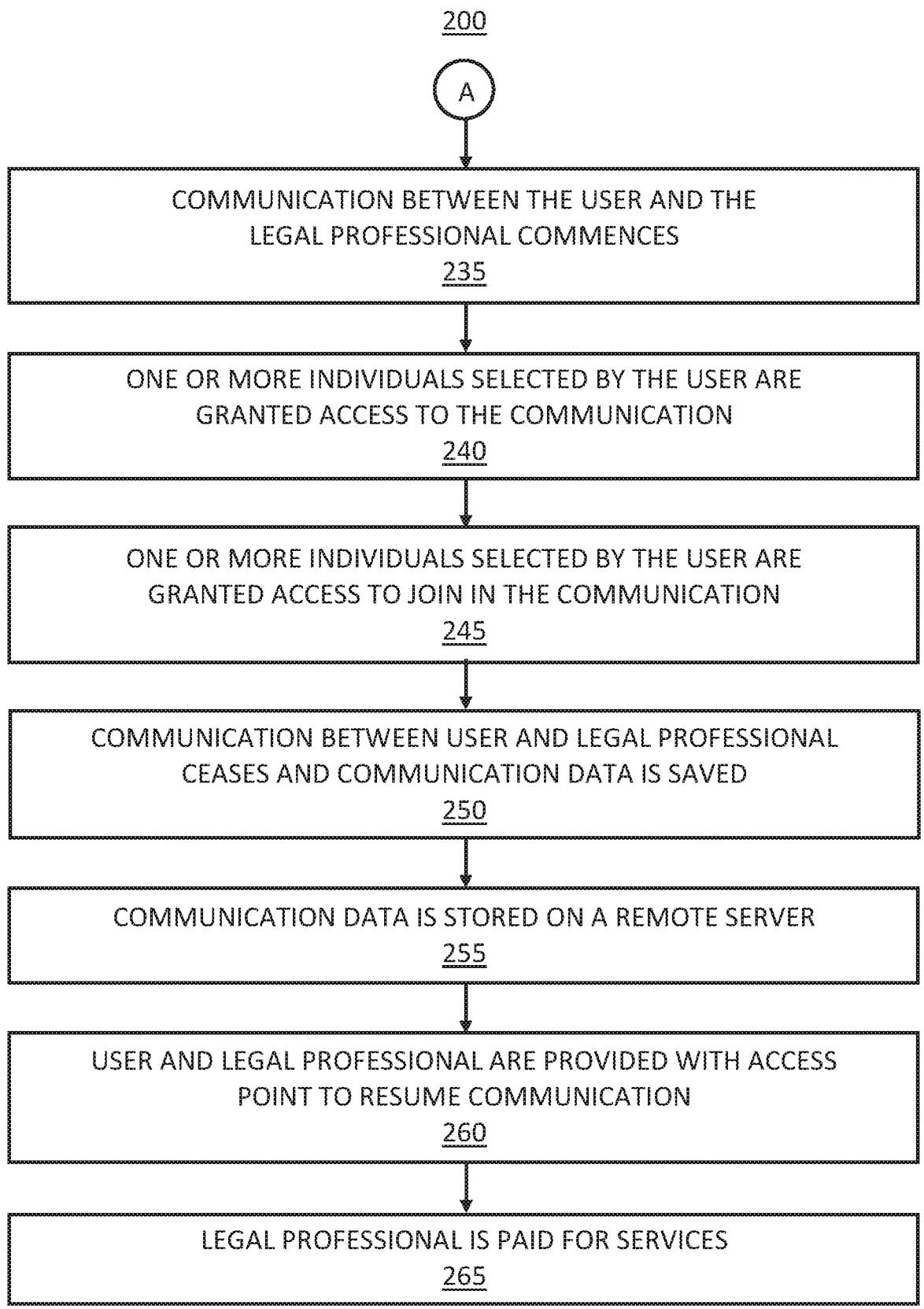

Referring now to FIGS. 2-3, a method 200 for communicating with a legal professional is illustratively depicted, in accordance with an embodiment of the present invention.

At step 205, a user 180 opens a digital application on an electronic device 110, According to an embodiment, the electronic device 110 may be a computer program, a website, and/or any other suitable digital application. According to an embodiment, the digital application is configured to enable communication between the first user 180 and the second user 190.

At step 210, the user 180, using the graphical user interface 140, selects one or more individuals 195 (e.g., friends, family members, etc.) to receive a notification upon completion of a request to communicate with a legal professional 190.

At step 215, the user 180, using the graphical user interface 140, requests communication with a legal professional, using the digital application. According to an embodiment, the request may include identifiable information from the user 180 such as, e.g., name, address, phone number, location, the problem at hand, and/or any other relevant information.

According to an embodiment, the request may be made to a particular legal professional 190 or to an unspecified legal professional 190. According to an embodiment, the request to speak with a legal professional 190 may include a message from the user 180 indicating the issue to be resolved. It is also noted that the request may also be a generic request to speak with a legal professional 190 that includes no information regarding the specific issue presently at hand for the user 180. According to an embodiment, the request to speak with a legal professional 190 is voice activated. According to an embodiment, the request is manually input into the electronic device 110, using the graphical user interface 140.

According to an embodiment, at step 220, upon completion of the request to communicate with a legal professional 190, the system 100 sends a notification to the one or more individuals 195 selected by the user 180. According to an embodiment, the notification is sent to one or more electronic devices 110 of the one or more users 195 selected by the user 180. According to an embodiment, the notification may include text, sounds, images, and/or any other means of notification. According to an embodiment, the notification may be an email, SMS, and/or any other suitable form of communication.

According to an embodiment, the notification may include the location of the user 180, any issues that the user 180 wishes to resolve, the name and/or contact information for the legal professional 190 in contact with the user 180, and/or any other relevant information pertaining to the user's 180 completed request.

At step 225, the legal professional 190 accepts the request for communication, and at step 230, upon accepting the request, the user 180 receives identifiable information on the legal professional 190, using the graphical user interface 140, and the legal professional 190 may receive further information from the user 180. According to an embodiment, the identifiable information on the legal professional 190 may include the legal professional's 190 name, phone number, email address, location, a description of the legal professional 190, and/or any other relevant information. According to an embodiment, the legal professional 190 decides what information is provided to the user 180. According to an embodiment, the legal professional 190 may be enabled to reject the request. According to an embodiment, in the event that the legal professional 190 rejects the request, the user 180 may be notified and/or the request is sent to another legal professional 190.

At step 235, communication between the user 180 and the legal professional 190 commences. According to an embodiment, the user 180 may communicate with the legal professional 190 through typed message, through voice communication, through video communication, and/or any other relevant form of communication. According to an embodiment, once the legal professional 190 commences communication with the user 180, a video feed with the legal professional 190 commences, whereby the user 180 can see and/or hear the legal professional 190 on the electronic device 110 and the legal professional 190 can see and/or hear the user 180. According to an embodiment, at step 240, the one or more individuals 195 the user 180 selected to receive a notification upon completion of the request to communicate with the legal professional 190 are granted access to the communication between the user 180 and the legal professional 190. According to an embodiment, at step 245, the one or more individuals 195 the user 180 selected to receive a notification upon completion of the request to communicate with the legal professional 190 are granted access to join in the communication between the user 180 and the legal professional 190.

At step 250, communication between the user 180 and the legal professional 190 ceases. According to an embodiment, the communication between the user 180 and the legal professional 190 is saved and, at step 255, saved data is stored on a remote server 105 using a wired and/or wireless connection (e.g., the data is saved to the cloud).

According to an embodiment, at step 260 the user 180 and/or the legal professional 190 are provided with an access point to resume communication.

At step 265, the legal professional 190 is paid for the legal professional's 190 services. It is noted, however, that the legal professional's 190 services may also be provided pro bona. According to an embodiment, in the event that the legal professional 190 is paid, the user or the user's contacts 195 pay for the legal professional's 190 services. According to an embodiment, in the event that the legal professional 190 is paid, the operators of the digital application pay for the legal professional's 190 services.

According to an embodiment, the present system 100 and method 200 increases the speed in which a user 180 can get a hold of a legal professional 190, and increases the speed in which contacts 195 are notified of a user's 180 status and location in the event of an emergency. These increases in efficiency thus improve upon the existing technology of obtaining professional advice from a legal professional 190 and thus may also aid in deescalating situations in which the inclusion of a legal professional 190 is needed.

According to an embodiment, the present system 100 and method 200 may be used in association with any suitable type of professional. For example, the present system and method may be used to contact psychologist, medical doctors, contractors, realtors, and/or any other suitable professionals.

Systems, Devices and Operating Systems

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and/or a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, Slate™, Motorola Xoom™, etc.), eBook reader(s) (e.g., Amazon Kindle™, Barnes and. Noble's Nook™ eReader, etc.), laptop computer(s), notebook(s), netbook(s), gaming console(s) (e.g., XBOX Live™, Nintendo® DS, Sony PlayStation® Portable, etc.), portable scanners) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM47501IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) r ray be employed.

Depending on the particular implementation, features of the present invention may be achieved by implementing a microcontroller such as CAST's R8051XC2 microcontroller; Intel's MCS 51 (i.e., 8051 microcontroller); and/or the like. Also, to implement certain features of the various embodiments, some feature implementations may rely on embedded components, such as: Application-Specific Integrated Circuit ("ARC"), Digital Signal Processing ("DSP"), Field. Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (110), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (WEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device s below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, lighting, video monitors and/or the like.

Cryptographic units such as, but not limited to, microcontrollers, processors, interfaces, and/or devices may be attached, and/or communicate with the controller of the present invention A MC68HC1.6 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely, slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to:

operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection), These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSI) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g. ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C#, and/or .NET, CGI scripts, Java, JavaScript, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), international Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash, (linked) list, strict, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component includes several tables. A Users operators and physicians) table may include fields such as, but not limited to: user_id, ssn, dob, first_name, last_name, age, state, address_firstline, address_secondline, zipcode, devices_list, contact_info, contact_type, alt_contact_info, alt_contact type, and/or the like to refer to any type of enterable data or selections discussed herein. The Users table may support and/or track multiple entity accounts. A Clients table may include fields such as, but not limited to: user_id, client_id, client_ip, client_type, client_model operating_system, os_version, app_installed_flag, and/or the like. An Apps table may include fields such as, but not limited to: app_ID, app_name, app_type, OS_compatibilities_list, version, timestamp, developer_ID, and/or the like. A beverages table including, for example, heat capacities and other useful parameters of different beverages, such as depending on size beverage_name, beverage_size, desired_coolingtemp, cooling_time, favorite_drinker, number_of_beverages, current_beverage_temperature, current_ambient_temperature, and/or the like. A Parameter table may include fields including the foregoing fields, or additional ones such as cool_start_time, cool_preset, cooling_rate, and/or the like. A Cool Routines table may include a plurality of cooling sequences may include fields such as, but not limited to: sequence_type, sequence_id, flow_rate, avg_water_temp, cooling_time, pump_setting, pump_speed, pump_pressure, power_level, temperature_sensor_id_number, temperature_sensor_location, and/or the like.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for remote communication with a legal professional, comprising:
    sending, using a graphical user interface coupled to an electronic device of a user, a request for communication with the legal professional,
        wherein the request includes identifiable information about a user, and
        wherein the electronic device of the user includes a processor and a memory;
    sending the request to one or more contacts selected by the user,
        wherein the one or more contacts is a third party to the user and the legal professional;
    notifying the legal professional of the request;
    accepting the request, using a graphical user interface coupled to an electronic device of the legal professional,
        wherein the electronic device of the legal professional includes a processor and a memory;
    sending identifiable information about the legal professional to the user; and
    enabling communication between the user and the legal professional using sensors coupled to the electronic device of the user and sensors coupled to the electronic device of the legal professional.

2. The method as recited in claim 1, further comprising: enabling the one or more contacts to see a communication between the user and the legal professional.

3. The method as recited in claim 1, further comprising: enabling the one or more contacts to contribute to a communication between the user and the legal professional.

4. The method as recited in claim 1, wherein the sensors coupled to the electronic device of the user and the sensors coupled to the electronic device of the legal professional are selected from the group consisting of: a microphone; a camera; and the graphical user interface.

5. The method as recited in claim 1, wherein the electronic device of the user and the electronic device of the legal professional are coupled via a remote server.

6. The method as recited in claim 1, wherein the identifiable information about the user is selected from the group consisting of: a name; an address; a phone number; a location; and a problem at hand for the user.

7. The method as recited in claim 1, further comprising: recording data pertaining to the communication between the user and the legal professional.

8. The method as recited in claim 7, further comprising: storing the data on a remote server.

9. A system for remote communication with a legal professional, comprising:
    an electronic device of a user, wherein the electronic device of the user includes a memory, a processor, a graphical user interface, and one or more sensors, and wherein the electronic device of the user is configured to:
        record, using the graphical user interface, a request for communication with the legal professional,
            wherein the request includes identifiable information about the user;
        notifying the legal professional of the request; and
        send the request;
        send the request to one or more contacts selected by the user,
            wherein the one or more contacts is a third party to the user and the legal professional; and
        communicate with an electronic device of the legal professional using the one or more sensors; and
    the electronic device of the legal professional, wherein the electronic device of the legal professional includes a memory, a processor, a graphical user interface, and one or more sensors, and wherein the electronic device of the legal professional is configured to:
        receive, using the graphical user interface, the request for communication with the legal professional;
        accept the request; and
        communicate with the electronic device of the user using the one or more sensors.

10. The system as recited in claim 9, further comprising:
    an electronic device of the one or more contacts selected by the user, and
    wherein the one or more contacts selected by the user are enabled, through the electronic device of the one or more contacts selected by the user, to see a communication between the user and the legal professional.

11. The system as recited in claim 9, further comprising:
    an electronic device of the one or more contacts selected by the user, and wherein the one or more contacts selected by the user are enabled, through the electronic device of the one or more contacts selected by the user, to contribute to a communication between the user and the legal professional.

12. The system as recited in claim 9, further comprising:
    a remote server configured to couple the electronic device of the user and the electronic device of the legal professional.

13. The system as recited in claim 12, wherein the remote server is further configured to record data pertaining to communication between the user and the legal professional.

14. The system as recited in claim 13, wherein the remote server is further configured to store the data.

15. The system as recited in claim 9, wherein the sensors coupled to the electronic device of the user and the sensors coupled to the electronic device of the legal professional are selected from the group consisting of: a microphone; a camera; and the graphical user interface.

16. The system as recited in claim 9, wherein the identifiable information about the user is selected from the group consisting of: a name; an address; a phone number; a location; and a problem at hand for the user.

\* \* \* \* \*